Sept. 13, 1932.  N. D. COLVIN  1,877,271
STALK LIFTER
Filed June 8, 1931   2 Sheets-Sheet 1
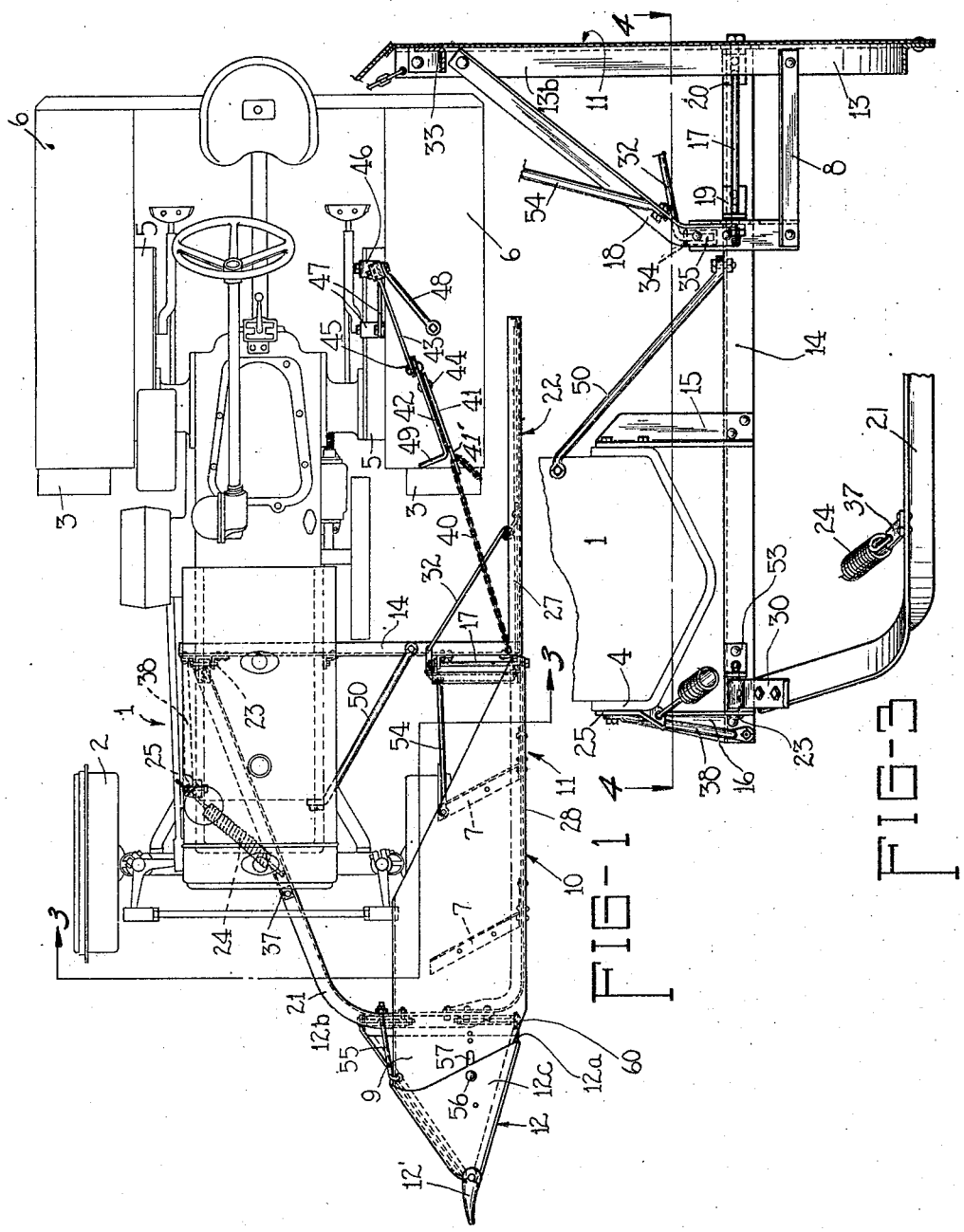
INVENTOR
Nolan D. Colvin
BY Brown, Jackson
Boettcher & Diemer
ATTORNEYS
WITNESS
Walter Ackerman

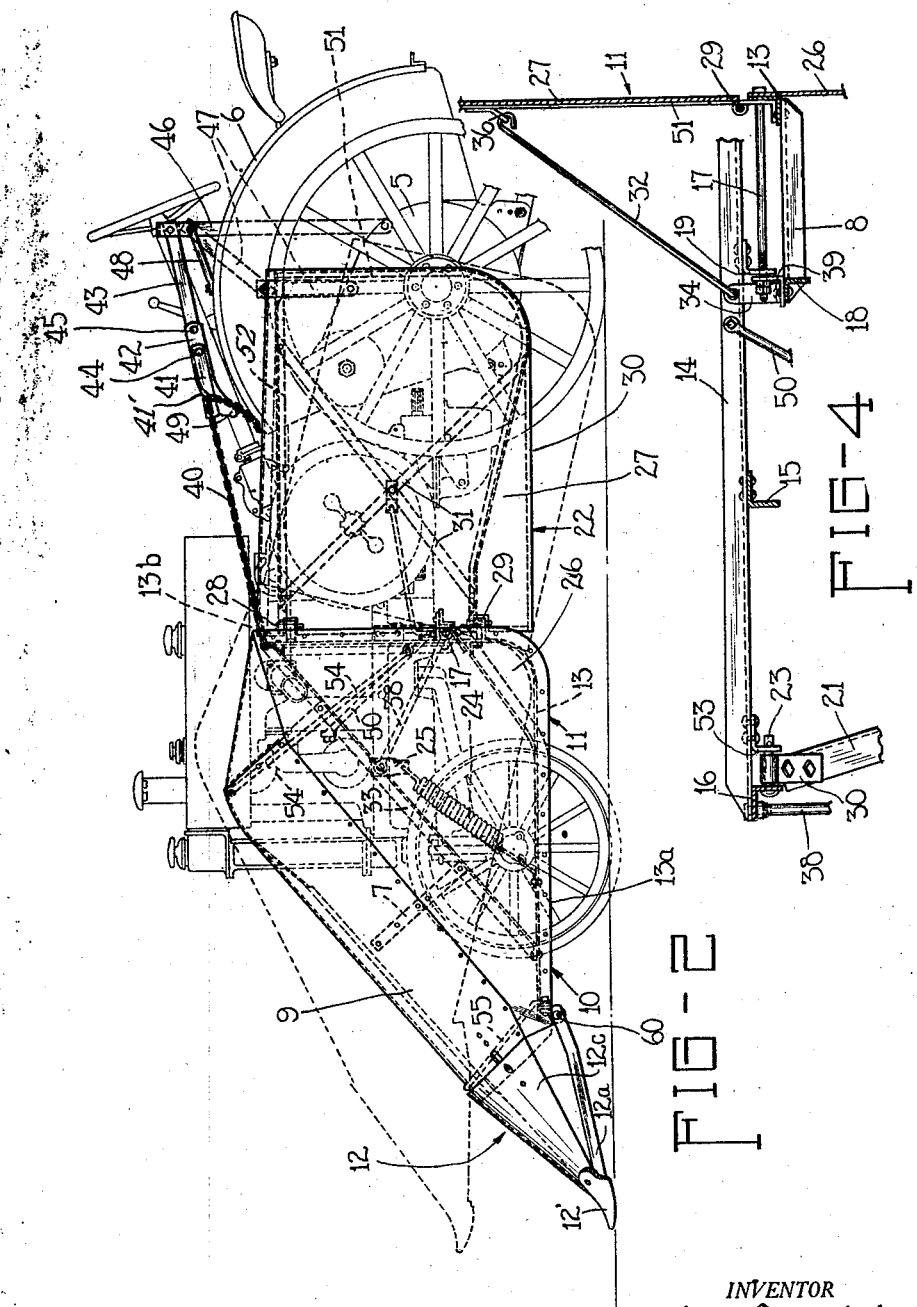

Patented Sept. 13, 1932

1,877,271

UNITED STATES PATENT OFFICE

NOLAN D. COLVIN, OF MOLINE, ILLINOIS, ASSIGNOR TO DEERE & COMPANY, OF MOLINE, ILLINOIS, A CORPORATION OF ILLINOIS

STALK LIFTER

Application filed June 8, 1931. Serial No. 542,749.

This invention relates to agricultural implements, and more particularly to grain stalk lifters, having particular reference to corn stalk lifters adapted to be mounted alongside one side of a tractor.

Generally the object of my invention is to provide a shield for a tractor to lift grain stalks which may be lying on or adjacent the ground, when the tractor is pulling a machine operating on the grain, and when the tractor is positioned next to and in close proximity alongside the grain.

More specifically, my invention has for its object the provision of a shield mounted alongside one side of a tractor when the tractor is pulling a corn picker, and the tractor is positioned to run next to the row being operated upon by the picker.

When picking corn with a tractor drawn picker, it is customary to position the tractor so that it straddles a picked row of corn two rows away from the row being operated upon by the picker in order that the tractor will not injure any corn which may have been blown down. This positions the tractor in a decided degree of offset with respect to the picker, and frequently an attempt is made to balance the load on the tractor by attaching a wagon alongside of the picker to the tractor in an offset relation with respect to the tractor and on the offset side thereof.

When a two row corn picker is used, however, it has been found that a wagon, particularly when it is empty, does not balance the load when the tractor is positioned so as to straddle a picked row two rows away from the rows being operated upon, as just explained. It is therefore desirable to position the tractor closer to the rows being operated upon in order to have more favorable pulling conditions for the tractor, but in such position it is desirable and practically necessary to place a shield of some kind alongside the side of the tractor adjacent the corn in order to pick up whatever blown down stalks are in the path of the tractor. Such a shield must operate rather close to the ground in order to be able to pick up said stalks, and it is also necessary that said shield be capable of being lifted to a considerable height above the ground in order to clear the ridges that are passed over crosswise when turning the tractor and picker at the end of the field.

One of the important features of my invention lies particularly in the manner in which the shield is mounted on the tractor. The shield is spring suspended so that it will readily follow any irregularities in the ground surface and is capable of being quickly and easily raised a foot or more above the ground for turning purposes. Furthermore it is generally necessary to have the shield extend rearwardly of the tractor sufficiently to prevent grain stalks from being run down by the rear wheels of the tractor as well as by the front wheels, and since it is frequently necessary to have access to the side of the tractor adjacent the shield, I mount the rear portion of the shield about a vertical axis for pivotal movement away from the tractor, so that the operator may have easy access to the tractor mechanism at any time.

Further objects and advantages of my invention will appear from the following detailed description of a preferred embodiment thereof, reference being had to the accompanying drawings, in which:—

Figure 1 is a top plan view of a tractor with my improved device mounted thereon;

Figure 2 is a side elevation of the combination shown in Figure 1;

Figure 3 is a fragmentary section in elevation taken substantially on the line 3—3 of Figure 1 and showing the method of mounting on the tractor; and Figure 4 is a fragmentary sectional view taken substantially on the line 4—4 of Figure 3.

Figure 1 discloses my improved shield mounted on one side of a tractor 1 having front wheels 2, rear wheels 3, a longitudinal frame 4, drive chain housings 5, and fenders 6. The shield shown in the drawings is mounted on the left side of the tractor, and is indicated in its entirety by the reference character 11, and comprises a front shield part 10 and a rear shield part 22. Front shield part 10 comprises a curved top portion 9 rearwardly inclined and having associated forwardly thereof and pivoted thereto a sheet metal floating shoe structure 12 tapering to a point 12'.

The shield 10 is mounted on a framework comprising members 13 and 33, member 13 having a vertical portion 13b and a forwardly extending horizontal portion 13a and the member 33 connects the two ends of member 13 by being riveted or otherwise secured thereto. This framework is pivotally mounted on a transverse supporting member 14 rigidly fastened underneath the tractor 1 by depending arms 15 and 16 bolted or otherwise secured to the frame portion 4 of the tractor and to the member 14, as illustrated in Figure 3. The framework comprising the members 13 and 33, is pivotally supported on member 14 through a pivotal connection comprising a horizontal pivoting pin 17. The pivot pin 17 is journaled in brackets 19 and 20 riveted or otherwise secured to the supporting member 14.

In order to give strength to this pivotal connection, a rigid brace member 18 is fixedly mounted on the member 13 and extends downwardly and inwardly of the vertical portion 13b thereof, being connected at its lower end with said member 13 by means of a horizontal brace connecting member or strut 8 (see Figure 3). Said pivoting pin 17 is also journaled in the vertical portion 13b of frame member 13 and in a bracket or clip 39 riveted or otherwise secured to brace member 18 (see Figure 4).

Frame member 13 is braced against transverse stresses by means of a diagonal brace member 21 which is rigidly connected to the horizontal portion 13a of member 13 adjacent the forward end thereof (see Figure 1). This member 21 passes underneath the front axle of the tractor and between the two front wheels thereof, and is pivotally connected at its rear end to the transverse supporting member 14 by means of a bolt 23. The member 21 therefore constitutes diagonal means for bracing the shield. Said bolt extends through a hinge leaf 30 bolted or otherwise secured to one end of the brace 21 and also through a bracket 53 riveted or otherwise secured to the transverse member 14 and through the depending arm 16, the bolt being held in position by any suitable means (see Figure 4). The pivot pin 17 and the bolt 23 are coincident with each other, that is they are in axial alinement.

One or more supporting arms 7 are secured to frame member 33 in order to form a foundation for the front shield. The entire frame of the front shield is covered with a suitable material, such as sheet metal, as illustrated at 26, riveted or bolted to the frame members 13, 33 and the arms 7.

A pair of hinges 28 and 29 are secured, as by being riveted, to the vertical portion of the frame member 13 above and below the pivot pin 17, respectively, each of said hinges having one leaf thereof extending rearwardly of the tractor, as best shown in Figure 2. The rearwardly extending leaf of the lowermost hinge has an extension 51 which is bent vertically at its rearmost portion in order to join the rearwardly extending leaf of the upper hinge, thus forming a framework for the rear shield part 22. Diagonal brace members 31 are connected to said upper and lower portions, as by riveting, in order to provide a vertically rigid framework. The rear shield part is also covered with suitable material, such as sheet metal, as indicated at 27. The hinges 28 and 29 are in axial alinement one above the other, and it will appear therefore that the rear shield 27 may be swung outwardly about its vertical axis away from the tractor. A latch rod 32 is provided to hold the rear shield 22 in its normal position in alinement with the front shield 26, as best illustrated in Figures 1 and 4. The latch rod is pivotally connected at one end thereof to the rear shield 22 by being pivotally held in a bracket 36 riveted or otherwise secured to both of the diagonal brace members 31 thereof (see Figure 2) and at the other end the rod has a depending portion 35 adapted to be loosely inserted down into a perforation in a bracket 34 mounted on the brace 18 and extending rearwardly therefrom. It will be apparent, that the rod 32 constitutes a detachable latch normally holding the rear shield 27 in operative position transversely, but permitting the operator to manually release the same and thereafter laterally swing the rear shield 27 outwardly from the tractor in order to have access to that side of the tractor for various purposes, such as cranking of the tractor by means of the fly-wheel, which in the tractor illustrated, is on the side of the tractor adjacent the rear shield.

The pivot 17 is so positioned relative to the shield, that the portion of the shield forwardly of said pivot is heavier than the portion rearwardly thereof, with the consequential result that the shield normally pivots forwardly and the shoe 12 normally engages the ground. I have provided means for counter-balancing the weight of the shield in the form of a counter-balancing spring 24 connected at one end to a bracket 25, bolted at the side of the tractor frame 4 in advance of the point at which the transverse supporting member 14 is connected to the tractor frame, as best illustrated in Figure 1. The opposite end of the spring 24 is connected to the brace member 21 by means of a bracket 37 riveted or otherwise secured to said member 21.

A rigid diagonal bar 38 is provided at the extreme end of transverse bar 14 opposite the shield 11 for bracing said end of the bar 14 with the tractor frame forwardly of the bar 14, as illustrated in Figures 2 and 3. Another rigid diagonal brace bar 50 extends upwardly and forwardly from the transverse supporting bar 14 to the frame of the tractor 4, said bar 50 being rigidly mounted to both, as by bolts, in order to insure a rigid mounting of transverse supporting bar 14, (see Figure 1). A brace bar 54 is bolted to the brace member 18 and extends upwardly and forwardly to the top of the front shield 10 being bolted to a frame arm 7 thereof for rigidly supporting the curved top portion 9 of said front shield.

The floating shoe structure 12 comprises a forwardly and downwardly sloping pair of arms 12a and 12b, pivotally connected as at 60 at their rear ends with the forward end of horizontal portion 13a of the frame member 13 and the diagonal brace bar 21, respectively, said arms converging to a point at which the shoe proper 12′ is rigidly secured. A piece of sheet metal 12c of substantially conical configuration is secured to the arms 12a and 12b, as illustrated, so that the uppermost portion thereof normally overlaps the lowermost portion of the upper curved portion 9 of the front shield 10 and has cooperating movement thereover by virtue of a lost motion bolt and slot connection 56 and 57. A rod 55, rigidly mounted on the forward portion of the diagonal brace 21, extends upwardly and supports the lowermost curved portion 9 of the front shield 10, adjacent the floating shoe structure 12. The rod 55 cooperates with the rod 54 in supporting the upper curved portion 9 of the front shield 10. Upon engagement of the point 12′ of the shoe 12 with ground ridges the shoe pivots about its pivot mounting 60. When the shoe is pivoted upwardly sufficient to cause the bolt 56 to contact the upper end of the slot 57 further upward pressure against the shoe will cause the entire shield 11 to pivot vertically about its axis 17, 23 transversely of the tractor.

The entire shield 11 is held on its pivot axis 17 in operative position, as illustrated in full lines in Figure 2, by means of a chain and toggle link mechanism comprising a chain 40, a link 41 and toggle links 42 and 43. The chain 40 is connected to the upper end of vertical portion frame member 13 and has any one of its links hooked into a slot 41′ provided for that purpose in the free end of link 41. Said link 41 is pivotally connected to link 42 at 44 and links 42 and 43 are connected together at 45. The link 43 is pivotally connected to an upright 46 which is bolted at its lower end to the drive chain housing 5 of the tractor and is braced by means of strut members 47 and 48, Figures 1 and 2. The forward end of the link 42 is provided with an inwardly extending handle 49. The chain and toggle link mechanism, just referred to, constitutes a yieldable means for holding the shield 11 on its pivot axis 17, the chain 40, being flexible, permits upward pivotal movement of the shield resulting from the shoe 12 riding over ridges, and acts as a stop for limiting downward pivotal movement of the shield.

It is apparent that when the operator wishes to lift the entire shield 11 vertically, into the position shown in dotted lines in Figure 2, as when turning the tractor and implement propelled thereby at the end of the field he merely swings the link 42 by means of handle 49 about its pivot 45 approximately 180 degrees until the handle 49 rests on the top edge of link 43. In this position the pivot 44 is brought slightly below the line connecting pivots 45 and handle 49, and as a result of which the shield 11 in its entirety will be automatically held in raised or inoperative position.

In operation, the counter-balancing spring 24 connected to the diagonal brace member 21 not only tends to counter-balance the weight of the entire shield, so that the point 12′ of the shoe 12 will readily follow the irregularities of the ground, but also it is easy for the operator to raise and lower the shield. The chain and toggle link mechanism 40, 41, 42 and 43, act as a stop to prevent further lowering of the shield 11 about its pivot 17, as illustrated by Figure 2.

I wish it to be understood that while I have shown and described a preferred embodiment of my invention, I do not wish to be limited thereto, as it is obvious that considerable changes may be made therein without deviating from the spirit of my invention as defined by the appended claims.

What I claim is:—

1. The combination with a tractor, of a stalk lifter shield pivotally mounted on the tractor at one side thereof, the front portion of the shield being adapted to engage the ground, and diagonal means connecting the shield with the tractor for bracing the shield.

2. The combination with a tractor, of a grain stalk lifter shield pivotally mounted on the tractor at one side thereof, the front portion of the shield being adapted to engage the ground, and diagonal means pivotally mounted on the tractor on the opposite side thereof and connected with the shield to brace the same against lateral stresses.

3. The combination with a tractor, having a frame, front wheels, and a front axle, of a stalk lifter pivotally mounted on the tractor frame and at one side thereof, diagonal brace means pivotally mounted on the tractor on an axis coincident with the pivot axis of the lifter and connecting the lifter adjacent the front end thereof with the tractor for bracing the lifter laterally of the tractor, said diagonal means extending under the front axle of the tractor and between the front wheels thereof, and means for yieldingly holding the lifter in operative position.

4. In combination, a tractor having a frame and front wheels, a grain stalk lifter shield having a frame and extending substantially the length and height of the tractor and being pivotally mounted between its ends on the tractor outside of the plane of the wheels and on an axis transversely of the tractor, a floating shoe connected to the foremost portion of the shield and adapted to engage the ground, a diagonal member rigidly connected to the forward portion of the frame of the shield at its front end and extending between the front wheels of the tractor and having its rear end pivotally mounted on the tractor frame on an axis coincident with the axis of the shield, and means for yieldingly holding the shield in a position whereby the floating shoe thereof is in ground engaging condition.

5. In combination, a tractor having a frame and front wheels, a grain stalk lifter shield extending substantially the length and height of the tractor and being pivotally mounted between its ends on the tractor outside of the wheels and on an axis transversely of the tractor, said shield comprising a plurality of hinged together parts one in front of the other and each having a frame, whereby one part is adapted to be swung laterally of the tractor, a floating shoe pivotally connected to the foremost portion of the front part of the shield and adapted to engage the ground, and a diagonal member rigidly connected to the forward portion of the frame of the front part of the shield and extending between the front wheels of the tractor and having its rear end pivotally connected with the tractor frame on an axis coincident with the axis of the shield.

6. In combination, a tractor having a frame and front wheels, a grain stalk lifter shield extending substantially the length and height of the tractor, and being pivotally mounted between its ends on the tractor outside of the wheels and on an axis transversely of the tractor, said shield comprising a front part, and a rear part each part having a frame and being hinged together about a vertical axis whereby the rear part may be swung laterally away from the tractor, a floating shoe pivotally connected with the foremost portion of the front part, a diagonal member rigidly connected to the forward portion of the frame of the front part of the shield and extending between the front wheels of the tractor and having its rear end pivotally mounted on the tractor frame on an axis coincident with the axis of the shield for bracing the front part against movement laterally of the tractor, and means for yieldingly supporting the shield in a position.

7. The combination with a tractor having a frame and front wheels, of a grain stalk lifter shield having a frame pivotally mounted on one side of and outside of the wheels of the tractor on an axis transversely thereof such that the shield normally pivots about its axis whereby the forward portion thereof tends to be lower than the rear portion thereof, ground engaging means carried by the forward portion of the shield, chain and link means for limiting the lowering of said forward portion, a diagonal brace connecting the forward portion of the frame of the shield with the frame of the tractor extending between the front wheels of the tractor, said brace being pivoted at its rear end to said frame of the tractor on an axis coincident with the axis of the shield, and a counter-balancing spring having one end connected to said brace and the other end connected to the frame of the tractor forwardly of said pivot axes tending to counter-balance the downward pivotal movement of said forward portion.

8. The combination with a tractor, of a grain stalk lifter shield having a ground engaging front portion, said shield being pivotally mounted on the tractor on an axis transversely of the tractor and at one side thereof so that the entire shield pivots in a vertical plane and the front portion of the shield normally tends to engage the ground as a result of the shield pivoting downwardly, and counter-balancing means tending to counter-balance said downward pivotal movement.

9. The combination with a tractor, of a grain stalk lifter shield having a ground engaging front portion, said shield being pivotally mounted on the tractor on an axis transversely of the tractor and at one side thereof, whereby the front portion of the shield normally tends to pivot downwardly, chain and link mechanism connecting the shield with the tractor for limiting said normal downward pivotal movement of the shield, counter-balancing spring means tending to counter-balance said normal pivotal movement and connecting the tractor with the shield forwardly of said pivotal mounting, said link mechanism including toggle means mounted on the tractor and operative for raising the shield into inoperative position and automatically holding the same in said position when so raised.

10. The combination with a tractor, of a grain stalk lifter shield having a ground engaging front portion, said shield being pivotally mounted on the tractor on an axis transversely of the tractor and at one side thereof, whereby the weight of the shield normally pivots the shield so that the front portion thereof is lower than the rear portion, a diagonal brace connecting the frame of the shield to the tractor and extending between the front wheels of the tractor, said brace being pivotally mounted to the tractor on an axis coincident with the pivotal mounting of the shield, link mechanism connecting the shield with the tractor for limiting the normal downward lowering of the front portion of the shield, and a counter-balancing spring means connecting the tractor forwardly of the shield pivot axis to said diagonal bar tending to counter-balance said downward pivotal movement of the shield, said link mechanism including toggle means mounted on the tractor and being manually operative for raising the shield into inoperative position and holding the same in said position.

11. The combination with a tractor, of a grain stalk lifter shield having a ground contacting portion and being pivotally mounted on the tractor at one side thereof so that the shield is overbalanced and said portion normally contacts the ground, and means for limiting pivotal movement of the shield in one direction but permitting pivotal movement thereof in the other direction during operation of the shield in operative position caused by said portion riding over ground ridges, said means including a chain and toggle link mechanism manually operative for raising and holding the shield into transport or inoperative position.

12. The combination with a tractor, of a grain stalk lifter pivotally mounted on the tractor at one side thereof, and chain and link mechanism connecting the lifter with the tractor for limiting the pivotal movement of the lifter in one direction, said mechanism including means operable for raising the lifter about its pivot axis in the other direction to inoperative position, said means locking the lifter when in such inoperative position.

13. The combination with a tractor, of a grain stalk lifter shield pivotally mounted on and at one side of the tractor, a toggle link mechanism mounted on the tractor and including a link having a slot adapted to receive and hold any one of different links of a chain, a chain connected at one end thereof with the upper portion of the shield and having any one of its links held in said slot, said chain and link mechanism limiting the pivotal movement of the shield in one direction, and said toggle link mechanism being manually operable for raising the shield into transport position and being automatically operable for holding the same in said transport position.

14. In combination, a tractor, a grain stalk lifter pivotally mounted on one side of the tractor for movement into and out of stalk lifting condition, and comprising two parts, said parts being pivotally connected together whereby one part may be swung in a horizontal plane relative to the tractor, means for moving the lifter into and out of stalk lifting position, diagonal bracing means connecting the lifter with the tractor, and counterbalancing means for the lifter.

15. In combination, a tractor, a grain stalk lifter shield pivotally mounted at one side of the tractor for movement into and out of operative position and comprising two parts, said parts being pivoted together whereby one part may be swung away from the tractor, and means for holding the shield in inoperative position.

16. The combination with a tractor having wheel hubs, of a grain stalk lifter shield pivotally mounted for movement into and out of operative stalk lifting position at one side of the tractor on an axis transversely of the tractor and extending in substantially a vertical plane from a point below a front wheel hub to substantially the height of the tractor whereby grain stalks will be prevented from contacting with the hubs, said shield comprising a plurality of hinged together shield parts, one of said shield parts being adapted to be swung horizontally, and means for yieldingly holding said shield in operative position.

17. In combination, a tractor, a grain stalk lifter shield pivotally mounted for movement into and out of operative stalk lifting position on one side of the tractor and comprising a front and rear part pivoted together about a vertical axis whereby the rear part is adapted to be swung away from the tractor, and means for releasably holding said rear part in alinement with the front part.

18. The combination with a tractor, of a grain stalk lifter shield extending longitudinally of the tractor and being pivotally mounted at one side thereof on an axis extending transversely of the tractor for movement into and out of operative position, said shield comprising a front and a rear part pivotally connected together about a vertical axis whereby the rear part may be swung away from the tractor, and releasable latch means for holding said rear part in alinement behind said front part, said front part having a declined forward portion and a floating shoe pivotally mounted at the foremost end thereof, said declined portion being curved inwardly of the tractor.

19. The combination with a tractor having wheel hubs, of a grain stalk lifter shield pivotally mounted for movement into and out of operative stalk lifting position at one side of the tractor and extending in a substantially vertical plane from a point below a front wheel hub to substantially the height of the tractor and being of substantially the same length as the tractor, comprising a plurality of hinged together shield parts, one of said shield parts being adapted to be swung horizontally, releasable means for holding said parts in the same vertical plane one behind another, and means including toggle links for supporting the shield in operative position, said links being manually operable for raising the shield to inoperative position and automatically locking the same in said inoperative position.

20. The combination with a tractor having front wheels, a front axle, and a frame, of a grain stalk lifter shield pivotally mounted on the tractor at one side thereof and outside of the wheels for vertical movement into and out of operative stalk lifting position on an axis transversely of the tractor so that the weight of the shield normally pivots the shield whereby the front portion thereof is lower than the rear portion, said shield being of substantially the same height and length as the tractor and having a portion extending forwardly of the front wheels of the tractor and comprising a front part having a frame and an upwardly and rearwardly inclined curved surface, said surface being curved inwardly of the tractor, brace means connecting the frame to the tractor frame to prevent lateral movement thereof including a diagonal brace member rigidly mounted to the front part of the shield and extending rearwardly between the front wheels of the tractor and under the front axle thereof and being pivotally connected with the frame of the tractor on an axis in alinement with the pivotal mounting of the shield, said front part having a floating ground contacting shoe pivotally mounted at the foremost portion thereof and adapted to engage the ground, and a rear part pivotally connected with the front part on a vertical axis adjacent the transverse pivotal mounting of the shield, whereby the rear part may be swung away from the tractor, manually operable latch means for holding said rear part in alinement with the front part, yieldable means for limiting the downward pivoting of the shield and the lowering of the front portion thereof including a toggle mechanism manually operable for pivoting the entire shield out of operative position, said toggle mechanism being operative automatically for holding the shield in inoperative position, and spring means connected with the frame of the tractor and the diagonal brace member in advance of the transverse pivoting axis of the shield for counter-balancing the weight of the shield.

21. The combination with a tractor, of a stalk lifter shield pivotally mounted for vertical movement on the tractor and comprising a plurality of hinged together parts, one of said parts being swingable in a horizontal plane, and releasable means normally holding said one part against swinging.

In witness whereof, I hereunto subscribe my name this 4th day of June, 1931.

NOLAN D. COLVIN.